April 22, 1969    G. E. MOORE ET AL    3,439,942
RETAINING MEMBER FOR COUPLING
Filed March 12, 1965    Sheet 1 of 2

INVENTORS.
GLENN E. MOORE
BY STEPHEN C. LEMON

*Kinney & Schenk*
ATTORNEYS

United States Patent Office 3,439,942
Patented Apr. 22, 1969

3,439,942
RETAINING MEMBER FOR COUPLING
Glenn E. Moore, Fairfield, and Stephen C. Lemon, Cincinnati, Ohio, assignors to Dover Corporation, Cincinnati, Ohio, a corporation of Delaware
Filed Mar. 12, 1965, Ser. No. 439,213
Int. Cl. F16b 7/00
U.S. Cl. 285—80                                    9 Claims

ABSTRACT OF THE DISCLOSURE

The invention involves the employment of a specific retainer means for holding the conventional lever arm of a male and female coupling in position. It includes a thin flat flexible resilient retaining member including a planar first portion having an aperture therein receiving a pin that pivots the lever arm. The retaining member has a resilient second portion normally bent at an angle to the plane of the first portion and overlying and contacting the lever arm and holding it in place.

This invention relates to a coupling and, more particularly, to a member for retaining or holding the coupling in its coupled position.

In a quick disconnect coupling a pair of levers is pivotally mounted on the female member for camming cooperation with the male member to quickly attach or detach the male member to the female member. When the coupling is arranged with the axis of the passage through the members horizontally disposed and one of the levers or arms disposed substantially beneath the other lever or arm, the lower lever or arm may be accidentally jostled from its coupling position. If this should occur, the male member is no longer sealed to the female member so that the passage through the coupled members is not leak proof. The present invention satisfactorily solves this problem by providing a device for retaining at least one of the levers or arms in its coupled position.

In a coupling of this type there are no means to lock the coupling in its coupled position. Thus, when the coupling is employed in a remote location, for example, where it may be subjected to vandalism or other destructive acts, the lever or arm may be easily moved from its coupled position to permit disconnection of the male member from the female member. The present invention not only retains the lever or arm in its coupled position but also provides means to permit the lever or arm to be locked in its coupled position.

The present invention also may be utilized to indicate whether a coupling has been moved from the coupling position. For example, the coupling could be disconnected and the fluid flowing through the passage in the male and female members could be surreptitiously removed therefrom. The present invention satisfactorily solves this problem by providing means on the retaining member to receive a sealing tape or the like to indicate if the coupling has been disconnected by an unauthorized person.

Accordingly, an object of this invention is to provide a device to retain a coupling, particularly a coupling of the quick disconnect type, in its coupled position.

Another object of this invention is to provide a device that may be readily employed with present couplings, particularly couplings of the quickly attachable and detachable type.

A further object of this invention is to provide a device having means to permit locking of a coupling in its coupled position.

In summary, the present invention provides a quick detachable means for unlocking the levers since the retaining member is resilient and may be pressed to one side by the thumb of the operator and out of the path of the upward swing of the lever, and thereby permit uncoupling of the members.

Other objects, uses, and advantages of this invention are apparent upon a reading of this description, which proceeds with reference to the drawings forming part thereof and wherein.

Figure 1:
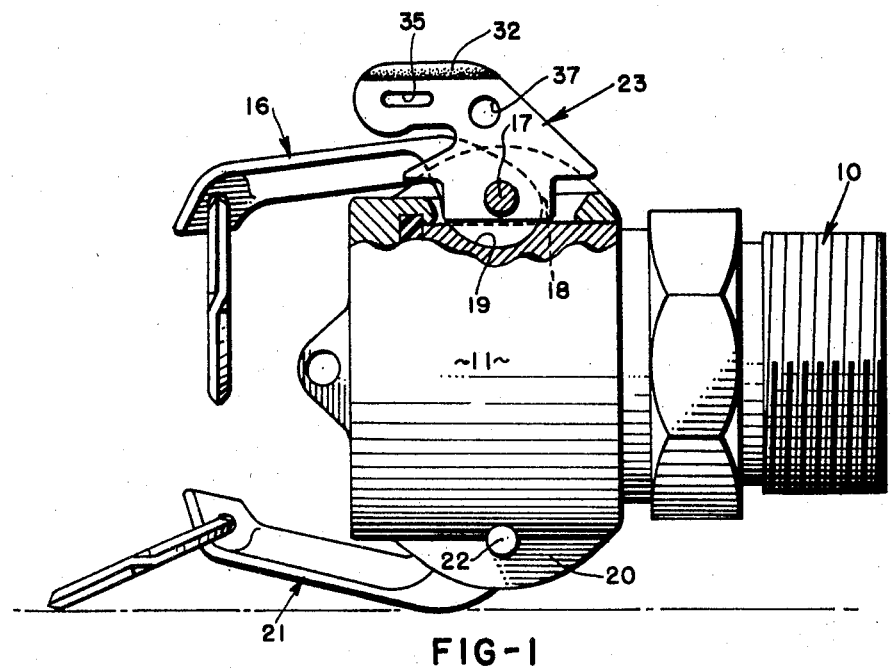
FIGURE 1 is a side elevational view, partly in section, of a coupling including the retaining member of the present invention.
Figure 2:
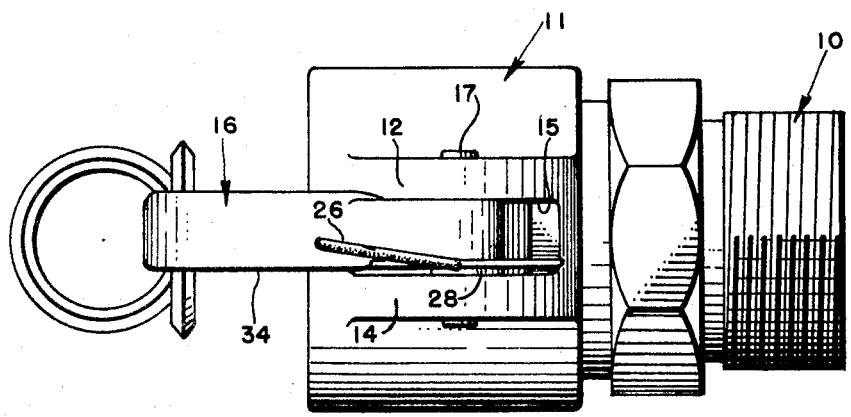
FIGURE 2 is a top plan view of the structure of FIGURE 1.
Figure 3:
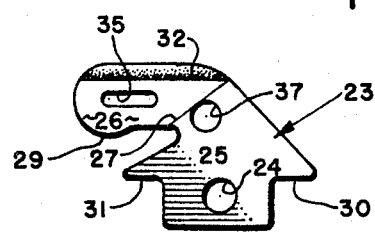
FIGURE 3 is a side elevational view of the retaining member of the present invention.

Referring to the drawings and particularly FIGURES 1 to 3, there is shown a male or plug member 10, which is adapted to fit within a female or socket member 11. The male member 10 has a passage extending therethrough and has its end, which is remote from the female member 11, connected to a hose (not shown) or the like. The female member 11 has a passage, which connects with the passage extending through the male member 10. While the female member 11 is shown as having the passage closed at the remote end from the male member 10 when the member 11 is used as a cap on an outlet pipe, for example, it may be opened for communicating with a hose, for example, attached to the female member 11.

The female member 11 has a pair of spaced bosses or lugs 12 and 14 formed integral therewith and extending outwardly therefrom. A slot 15 is disposed between the spaced lugs 12 and 14 to provide communication from the exterior of the female member 11 to the interior thereof.

A lever or arm 16 is pivotally mounted on the female member 11 by a pin 17 extending through an aperture in the lever or arm 16 and aligned apertures in the bosses 12 and 14. The lever or arm 16 has a boss 18 (see FIGURE 1), which cooperates with a curved annular groove 19 in the outer wall of the male member 10.

A pair of spaced bosses or lugs (one shown at 20) is diametrically disposed with respect to the bosses 12 and 14 and formed integral with the female member 11 on the exterior thereof. A second lever or arm 21 is pivotally mounted on the female member 11 by a pin 22, which extends through aligned apertures in the spaced lugs (one shown at 20) and an aperture in the lever 21. The lever 21 has a boss (not shown), which cooperates with the annular groove 19 in the outer wall of the male member 10 through a slot (not shown) in the member 11 in the same manner as the boss 18 of the lever 16.

A retaining member 23 (see FIGURE 3) has an aperture 24 in its first or lower portion 25 to permit mounting of the member 23 on the pin 17. The retaining member 23 has a second portion 26, which is disposed above the first portion 25. The second or upper portion 26 extends at an angle, preferably 10 degrees, to the plane of the first portion 25 as shown in FIGURE 2. The division between the first portion 25 and the second portion is along line 27 or thereabout. A bushing 28 (see FIGURE 2) is positioned on the pin 17 between the retaining member 23 and the lug 14 to maintain the retaining member 23 in spaced relation to the lug 14.

When the lever 16 is in its coupled position wherein it connects the male member 10 to the female member 11, the portion 26 is disposed above the lever 16 and has a rounded surface 29 on its lower part for engaging the top of the lever 16. Since the rounded surface 29 is the only engagement of the retaining member 23 with the lever 16, the friction, which must be overcome when it is desired to remove the retaining member 23 from engagement with the lever 16, is small.

The retaining member 23 has shoulders 30 and 31 (see FIGURE 3) on opposite sides of the aperture 24. The shoulders 30 and 31 rest on portions of the female or socket member 11 adjacent the slot 15. Thus, the retaining member 23 has three points of contact with the member 11 through the pin 17 and the shoulders 30 and 31 to provide a stable support for the retaining member 23.

The second portion 26 of the retaining member 23 has its upper part 32 covered or coated with a material, which may be readily encountered by the user without injury, such as a soft vinyl plastic. The upper part 32 of the second portion 26 of the retaining member 23 is offset with respect to the remainder of the portion 26 as shown in FIGURES 4 to 7. Thus, the upper part 32 is not engaged by the lever 16 during its pivotal movement about the pin 17 from its coupled position to its non-coupled position and vice versa whereby the plastic material is not scraped.

The retaining member 23, which is preferably formed of a hardened and tempered steel, has sufficient resiliency to permit movement of the second portion 26 with respect to the first portion 25 so that the rounded surface 29 may be moved from engagement with the lever 16. Because of this resiliency, only the thumb of the user is necessary to move the second portion 26 of the retaining member 23 to allow movement of the lever 16 from its coupled position.

Figure 4:
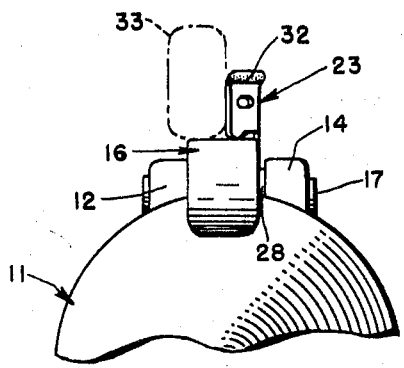
FIGURE 4 is an end elevational view of a portion of the structure of FIGURE 1 and showing a thumb of a user in phantom.

With the retaining member 23 holding the lever 16 in its coupled position, the sequence of operation in removing the retaining member 23 from the position in which it holds the lever 16 in its coupled position to a position wherein the lever is free of the retainer member, is illustrated in FIGURES 4 to 7. In FIGURE 4, a thumb 33 of a user is shown in phantom in engagement with the second portion 26 of the retaining member 23. In FIGURE 4, the lever 16 is in its coupled position and is held there by the retaining member 23.

Figure 5:
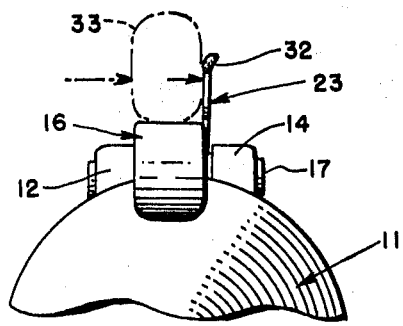
FIGURES 5 to 7 are end elevational views, similar to FIGURE 4, showing the various positions of the retaining member as one of the levers is moved from its coupling position.

As shown in FIGURE 5, the thumb 33 of the user exerts a pressure on the second portion 26 of the retaining member 23 in the direction of the arrows to move the retaining member 23 so that the round surface 29 ceases to engage the top of the lever 16. The remaining fingers of the user grasp the lever 16. This movement causes the second portion 26 to be displaced angularly to the opposite side of the first portion 25, which is substantially parallel to the longitudinal axis of the lever 16, from the position of FIGURES 1, 2 and 4. In the position of FIGURE 5, the second portion 26 of the retaining member 23 is no longer holding the lever 16 in its coupled position and is moved sufficiently to allow the lever 16 to be pivoted about the pin 17.

Figure 6:
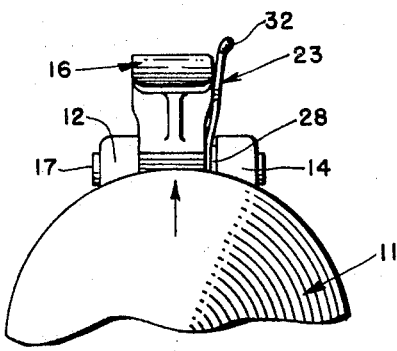
Figure 7:
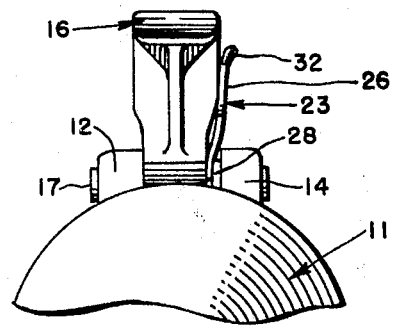

The lever 16 may then be pivoted about the pin 17. As shown in FIGURE 6, the lever 16 is moved upwardly in the direction of the arrow. One side 34 of the lever 16 bears against one face of the second portion 26 as the lever 16 is pivoted about the pin 17 to maintain the second portion 26 out of the path of movement of the lever 16.

Thus, once the lever 16 has its side 34 in engagement with the second portion 26 of the retaining member 23, the thumb 33 of the user need no longer be held against the retaining member 23 since the lever 16 maintains the second portion 26 out of the path of movement of the lever 16.

As shown in FIGURE 6, the side 34 of the lever 16 does not contact the upper part 32 of the second portion 26 of the retaining member 23 during its pivoting about the pin 17 because the upper part 32 of the second portion 26 is offset with respect to the remainder of the second portion 26. Thus, there is no scraping of the plastic surface on the upper part 32.

As the lever 16 continues its pivoting about the pin 17, it advances until its side 34 ceases to engage the second portion 26 of the retaining member 23. Thus, shortly after the lever 16 passes the position of FIGURE 7, it ceases to contact the second portion 26 of the retaining member 23 whereby the second portion 26 returns to the position of FIGURE 4.

Accordingly, it is unnecessary to move the second portion 26 of the retaining member 23 when it is desired to return the lever 16 to its coupling position. When the lever 16 is moved from its uncoupled position to its coupled position, the lower edge of the lever 16 misses the upper edge of the portion 26 and abuts against the sidewall of said portion thereby forcing the portion outwardly in the same direction and manner as caused by thumb action in FIGURES 5–7, as the lever 16 is moved to its coupled position. When the upper surface of lever 16 has cleared the bottom edge of portion 26 said portion will snap over the lever 16 as shown in the position of FIGURE 4.

It should be understood that the lever 21 is being moved at the same time as the lever 16. Since only one hand is required to move the second portion 26 of the retaining member 23 and the lever 16 simultaneously, the other hand may be used to actuate the lever 21. Accordingly, quick coupling or uncoupling of the male member 10 to the female member 11 is accomplished with the present invention.

Figure 8:
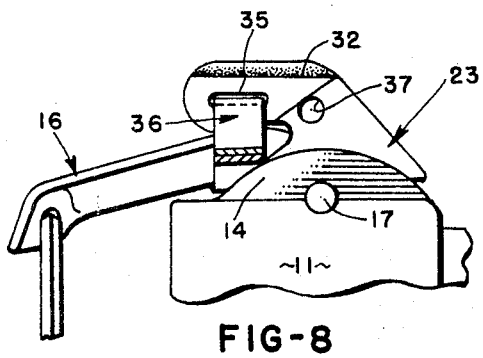
FIGURE 8 is a side elevational view of a portion of the structure of FIGURE 1 and showing a sealing tape or the like being used with the retaining member of the present invention.

Referring to FIGURE 8, the second portion 26 of the retaining member 23 has an elongated slot 35 formed therein beneath the upper part 32. The slot 35 is adapted to receive an indicating member such as a sealing tape 36, for example. The utilization of the sealing tape 36 will indicate if the lever 16 has been moved by an unauthorized person. Thus, when the female member 11 is used as a cap on the end of a supply conduit, for example, any unauthorized opening of the cap would be readily ascertainable through the sealing tape 36.

Figure 9:
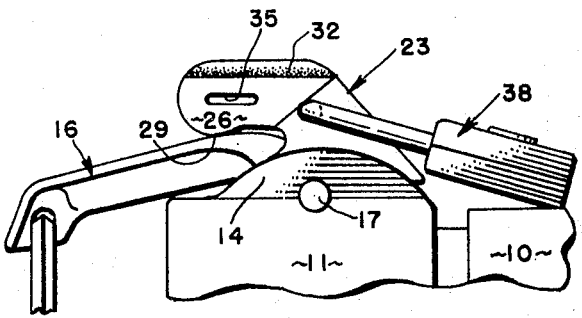
FIGURE 9 is a side elevational view of a portion of the structure of FIGURE 1 and showing a lock being used with the retaining member of the present invention.

The lower portion 25 of the retaining member 23 has an aperture or opening 37 for cooperation with a lock 38, for example, as shown in FIGURE 9. The utilization of the lock 38 in the aperture or opening 37 of the retaining member 23 prevents an uncoupling of the female member 11 from the male member 10 by actuation of the lever 16. The lock 38 prevents pivoting of the lever 16 to its uncoupled position even if the second portion 26 of the retaining member 23 is moved from the position in which the rounded surface 29 engages the lever 16 to hold it in its coupled position. This arrangement prevents any unauthorized disconnection of the female member 11 from the male member 10.

While the present invention has been shown with the retaining member 23 being used only with the lever 16, it should be understood that a second retaining member 23 could be employed to cooperate with the lever 21 if desired. This would be particularly useful to prevent any unauthorized movement of the lever 21 when the locks 38 are employed with the retaining members 23, for example.

An advantage of this invention is that it prevents accidental disconnection of a coupling, particularly of the quickly attachable and detachable type. Another advantage of this invention is that only one hand is required for operation of both the coupling lever and the retaining member. A further advantage of this invention is that the retaining member is covered with a noninjurious surface to prevent danger of injury to the user if his hand should slip while pressing on the retaining member to move it. Still another advantage of this invention is that the plastic surface is not engaged by the coupling lever during movement to and from the coupling position so that the plastic surface cannot be scraped during movement of the coupling lever.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. In a separable coupling having a pair of cooperating members with one of said members disposed in the end of the other of said members, a pair of oppositely disposed pin means attached to said other member, a member pivotally mounted on each of said pin means and locking means on said one member, said pivoted members engaging said locking means on said one member to couple said members to each other, a retaining member including a first portion having an aperture therein receiving one of said pin means to mount said retaining member thereon, said retaining member having means thereon cooperating with means on said other member substantially preventing rotation of said retaining member relative to said pin means and said other member, said first portion being disposed substantially parallel to the longitudinal axis of said member pivotally mounted on said one pin means, said retaining member including a second portion disposed above said first portion and at an angle to said first portion extending over said pivoted member when said pivoted member is in its coupling position holding said pivoted member in its coupling position, and being movable transversely relative to said pivoted member out of contact with said pivoted member to thereby release said pivoted member for uncoupling movement and said retaining member having an aperture therein receiving locking means locking said pivoted member in its coupled position.

2. In a separable coupling having a pair of cooperating members with one of said members disposed in the end of the other of said members, a pair of oppositely disposed pin means attached to said other member, a member pivotally mounted on each of said pin means, and locking means on said one member, said pivoted members engaging said locking means on said one member to couple said members to each other, a retaining member including a first portion having an aperture therein receiving one of said pin means to mount said retaining member thereon, said retaining member having means thereon cooperating with means on said other members substantially preventing rotation of said retaining member relative to said pin means and said other member, said first portion being disposed substantially parallel to the longitudinal axis of said member pivotally mounted on said one pin means, said retaining member including a second portion disposed above said first portion and at an angle to said first portion extending over said pivoted member when said pivoted member is in its coupled position holding said pivoted member in its coupled position, and being movable transversely relative to said pivoted member out of contact with said pivoted member to thereby release said pivoted member for uncoupling movement, and said retaining member having a slot therein receiving a sealing tape or the like to indicate whether either of said pivoted members has been moved from its coupled position.

3. In a separable coupling having a pair of cooperating members with one of said members disposed in the end of the other of said members, a pair of oppositely disposed pin means attached to said other member, a member pivotally mounted on each of said pin means, and locking means on said one member, said pivoted members engaging said locking means on said one member to couple said members to each other, a retaining member including a first portion having an aperture therein receiving one of said pin means to mount said retaining member thereon, said retaining member having means thereon cooperating with means on said other member substantially preventing rotation of said retaining member relative to said pin means and said other member, said first portion being disposed substantially parallel to the longitudinal axis of said member pivotally mounted on said one pin means, and said retaining member including a second portion disposed above said first portion and at an angle to said first portion extending over said pivoted member when said pivoted member is in its coupled position holding said pivoted member in its coupled position, and being movable transversely relative to said pivoted member out of contact with said pivoted member to thereby release said pivoted member for uncoupling movement, said second portion having a rounded surface on its lower part in engagement with said pivoted member and being movable to an unlocking portion.

4. In a separable coupling having a pair of cooperating members with one of said members disposed in the end of the other of said members, a pair of oppositely disposed pin means attached to said other member, a member pivotally mounted on each of said pin means, and locking means on said one member, said pivoted members engaging said locking means on said one member to couple said members to each other, a retaining member including a first portion having an aperture therein receiving one of said pin means to mount said retaining member thereon, said retaining member having means therein cooperating with means on said other member substantially preventing rotation of said retaining member relative to said pin means and said other member, said first portion being disposed substantially parallel to the longitudinal axis of said member pivotally mounted on said one pin means, said retaining member including a second portion disposed above said first portion and at an angle to said first portion extending over said pivoted member when said pivoted member is in its coupled position holding said pivoted member in its coupled position, and being movable transversely relative to said pivoted member out of contact with said pivoted member to thereby release said pivoted member for uncoupling movement, said second portion having its lower part engaging said pivoted member and its upper part offset with respect to its lower part, and said upper part of said second portion having a coating of a soft material.

5. In a separable coupling having a pair of cooperating members with one of said members disposed in the end of the other of said members, a pair of oppositely disposed pin means attached to said other member, a member pivotally mounted on each of said pin means, and locking means on said one member, said pivoted members engaging said locking means on said one member to couple said members to each other, a retaining member including a first portion having an aperture therein receiving one of said pin means to mount said retaining member thereon, said retaining member having means thereon cooperating with means on said other member substantially preventing rotation of said retaining member relative to said pin means and said other member, said first portion being disposed substantially parallel to the longitudinal axis of said member pivotally mounted on said one pin means, said retaining member including a second portion disposed above said first portion and at an angle to said first portion extending over said pivoted member in its coupled position holding said pivoted member in its coupled position and being movable transversely relative to said pivoted member out of contact with said pivoted member to thereby release said pivoted member for uncoupling movement, said second portion having its lower part engaging said pivoted member and its upper part offset with respect to its lower part, and said upper part of said second portion having a coating of a plastic material.

6. In a separable coupling having a pair of cooperating members with one of said members disposed in the end of the other of said members, a pair of oppositely disposed pin means attached to said other member, a member pivotally mounted on each of said pin means and locking means on said one member, said pivoted members engaging said locking means on said one member to couple said members to each other, a retaining member including a first portion having an aperture therein receiving one of said pin means to mount said retaining member thereon, said retaining member having means thereon cooperating with means on said other member substantially preventing rotation of said retaining member relative to said pin means and said other member, said first portion being disposed substantially parallel to the longitudinal axis of said member pivotally mounted on said one pin means, said retaining member including a second portion disposed above said first portion and at an angle of 10° to said first portion extending over said pivoted member when said pivoted member is in its coupled position holding said pivoted member in its coupled position, and being movable transversely relative to said pivoted member out of contact with said pivoted member to thereby release said pivoted member for uncoupling movement, said second portion having its lower part engaging said pivoted member and its upper part offset with respect to its lower part, and said upper part of said second portion having a coating of a plastic material.

7. In a separable coupling having a pair of cooperating members with one of said members disposed in the end of the other of said members, a pair of oppositely disposed pin means attached to said other member, a member pivotally mounted on each of said pin means, and locking means on said one member, said pivoted members engaging said locking means on said one member to couple said members to each other, a retaining member including a first portion having an aperture therein receiving one of said pin means to mount said retaining member thereon, said retaining member having means thereon cooperating with means on said other member substantially preventing rotation of said retaining member relative to said pin means and said other member, said first portion being disposed substantially parallel to the longitudinal axis of said member pivotally mounted on said one pin means, said retaining member including a second portion disposed above said first portion and at an angle to said first portion extending over said pivoted member when said pivoted member is in its coupled position holding said pivoted member in its coupled position, and being movable transversely relative to said pivoted member out of contact with said pivoted member to thereby release said pivoted member for uncoupling movement, said second portion having its lower part engaging said pivoted member and its upper part offset with respect to its lower part, said upper part of said second portion having a coating of a soft material, and said retaining member having an aperture therein receiving locking means locking said pivoted member in its coupled position.

8. In a separable coupling having a pair of cooperating members with one of said members disposed in the end of the other of said members, a pair of oppositely disposed pin means attached to said other member, a member pivotally mounted on each of said pin means, and locking means on said one member, said pivoted members engaging said locking means on said one member to couple said members to each other, a retaining member including a first portion having an aperture therein receiving one of said pin means to mount said retaining member thereon, said retaining member having means thereon cooperating with means on said other member substantially preventing rotation of said retaining member relative to said pin means and said other member, said first portion being disposed substantially parallel to the longitudinal axis of said member pivotally mounted on said one pin means, said retaining member including a second portion disposed above said first portion and at an angle to said first portion extending over said pivoted member when said pivoted member is in its coupled position holding said pivoted member in its coupled position, and being movable transversely relative to said pivoted member out of contact with said pivoted member to thereby release said pivoted member for uncoupling movement, said second portion having its lower part engaging said pivoted member and its upper part offset with respect to its lower part, said upper part of said second portion having a coating of a soft surface and said retaining member having a slot therein receiving a sealing tape to indicate whether either of said pivoted members has been moved from its coupled position.

9. In a separable coupling having a pair of cooperating members with one of said members disposed in the end of the other of said members, a pair of oppositely disposed pin means attached to said other member, a member pivotally mounted on each of said pin means and locking means on said one member, said pivoted members engaging said locking means on said one member to couple said members to each other, a retaining member including a first portion having an aperture therein receiving one of said pin means to mount said retaining member thereon, said retaining member having means thereon cooperating with means on said other member substantially preventing rotation of said retaining member relative to said pin means and said other member, said first portion being disposed substantially parallel to the longitudinal axis of said member pivotally mounted on said one pin means, said retaining member including a second portion disposed above said first portion and at an angle to said first portion extending over said pivoted member when said pivoted member is in its coupling position holding said pivoted member in its coupling position, and being resiliently movable transversely relative to said pivoted member out of contact with said pivoted member to thereby release said pivoted member for uncoupling movement.

References Cited

UNITED STATES PATENTS

| 1,814,412 | 7/1931 | Rutten | 285—80 X |
| 637,505 | 11/1899 | Franklin | 285—80 X |
| 1,542,335 | 6/1925 | Gardarelli | 285—81 |
| 1,639,813 | 8/1927 | Schawrow | 285—312 X |
| 2,187,119 | 1/1940 | Fish | 285—5 |
| 2,677,558 | 5/1954 | Cornelius | 285—6 |
| 3,124,374 | 3/1964 | Krapp | 285—88 X |
| 3,268,249 | 8/1966 | Owens | 285—312 |

EDWARD C. ALLEN, *Primary Examiner.*

D. W. AROLA, *Assistant Examiner.*

U.S. Cl. X.R.

285—82, 312